United States Patent [19]

Ehlers

[11] 3,906,458

[45] Sept. 16, 1975

[54] ODD-SIZED MEMORY HAVING A PLURALITY OF EVEN-SIZED STORAGE ELEMENTS OF THE SAME CAPACITY

[75] Inventor: Randall Gordon Ehlers, San Jose, Calif.

[73] Assignee: Burroughs Corporation, Detroit, Mich.

[22] Filed: Aug. 28, 1974

[21] Appl. No.: 501,235

[52] U.S. Cl. .......................... 340/172.5; 340/173 R

[51] Int. Cl.[2] .......................................... G11C 13/00

[58] Field of Search ...................... 340/172.5, 173 R

[56] References Cited

UNITED STATES PATENTS 3,757,312 9/1973 Shore .............................. 340/172.5

*Primary Examiner*—Terrell W. Fears

*Attorney, Agent, or Firm*—G. H. Friedman; N. Cass; K. R. Peterson

[57] ABSTRACT

A memory which comprises a plurality of physically distinct storage elements, each having $2^M$ individually addressable storage locations therein, for storing more than $2^M$ but less than $2^{M+1}$ words, M being an integer. The storage elements are separated into a first group and a second group. Portions of the memory address are termed the expansion address and the row address. When the expansion address is in a first predetermined state, means responsive to the address causes all of the storage elements of the first group and a subset of the storage elements of the second group to be made available for access. The members of the subset are determined and varied by means responsive to the several states of the row address. When the expansion address is not in its first predetermined state, all of the storage elements of the second group only are made available for access.

31 Claims, 13 Drawing Figures

ODD-SIZED MEMORY HAVING A PLURALITY OF EVEN-SIZED STORAGE ELEMENTS OF THE SAME CAPACITY

BACKGROUND OF THE INVENTION

1. Field of the Invention

This invention relates generally to improvements in memories of the type wherein a plurality of physically distinct storage elements, each having a plurality of individually addressable storage locations, are operatively interconnected to form a word-addressable memory. More particularly, the invention pertains to such memory assemblies where the number of words to be stored therein is other than an integer exponential power of 2.

2. Description of the Prior Art

An address register or address signal having M possible states, where M is any positive integer, is capable of uniquely defining $2^M$ addresses for a memory. For this reason, standard commercially available memory sub-assemblies, or storage elements, capable of being interconnected to form larger memories of a desired size are ordinarily built to have $2^M$ individually addressable storage locations for one or more bits, M being any integer chosen for convenience. It is usually economically desirable to use these commercially available storage elements to construct a memory of a given size whenever it is otherwise appropriate and practical to do so.

The capacities of complete memories and of individual storage elements, are commonly given in terms of the number of individually addressable storage locations therein and the number of bits storable in each such location. Given a memory having a storage location for W words of B bits each, the capacity of the memory is thus W by B or, equivalently, W × B. For complete memory, if W is equal to $2^M$, M being a positive integer, the memory may be said to be "even-sized." For example, a memory for storing 256 words is an even-sized memory according to this convention, i.e., $256 = 2^8$ and M = 8. However, a memory for storing 288 words cannot be called an even-sized memory by this convention even though the number 288 is "even" in the usual sense of that word. For the purpose of describing this invention, memories for storing a number of words such as 288 or the like, where the number is not an integer exponential power of 2, will be termed "odd-sized" memories.

An example of a commercially available storage element of the type mentioned above is the Type SN74S206 256-Bit Read/Write Memory, a 256 × 1 storage element, described in detail on pp. 470–472 of the catalog "The TTL Data Book For Design Engineers" published by Texas Instruments Incorporated, 1973. This storage element is termed an RAM or random access memory. Copies of the referenced catalog may be procured from the aforementioned company by communicating with their Components Group, Marketing Communications Dept., P.O. Box 5012, M.S. 84, Dallas, Texas 75222. By way of example, eight such storage elements can be conveniently interconnected by techniques, described briefly hereinafter, which are well known to those having ordinary skill in the art to form a 256 × 8 even-sized memory. Each of these storage elements has 256 individually addressable storage locations for one bit each. These particular storage elements are suitable for use in read/write memories.

However, should one wish to build a 288 × 8 memory using the same type of storage element and prior art techniques for interconnecting them, 16 of the elements would be required. Thus, twice as many storage elements would be required and the excess capacity of 244 × 8 would be wasted. If the wasting of capacity were especially troublesome, a 288 × 8 memory could be built, for example, using eight of the aforementioned Type SN74S206 storage elements and 16 Type SN7481A storage elements, the latter having a capacity of 16 × 1 as described on pp. 190–194 of the aforementioned catalog. In this latter example, the number of storage elements required is further increased and two different types of storage elements are required. The catalog referenced above does not list any 32-word storage elements having a read/write capability. The cost of implementing a given design for a memory will be increased significantly as the number of storage elements required is thus increased. Also, it is often considered to be undesirable to use more than the minimum number of different types of parts in a given piece of equipment since a proliferation of part-types increases inventory control costs, inter alia.

Using the subject invention as will be more fully described hereinafter, a 288 × 8 memory may be built, for example, using only nine 256 × 1 storage elements with no wasted capacity.

In the aforementioned prior-art technique for building a memory comprising a plurality of storage elements, each storage element is supplied with an address signal which is identical to all or part of the memory address signal for the memory as a whole. For example, the 256 × 8 even-sized memory mentioned above requires an 8-bit memory address signal. This same signal, or its equivalent is supplied as an element address signal to each of the eight 256 × 1 storage elements which may be operatively interconnected to form the memory. The capacity of a storage location in a storage element determines the size of a word segment. Thus, where 8 256 × 1 storage elements are used to form a memory for storing 8-bit words, each word comprises eight word segments of one bit each. Each storage element is used to store word segments in the same relative position within a word for all words to be stored. Thus, a first one of the storage elements is used to store the most significant word segment, here the most significant bit, of all the words to be stored, a second one of the storage elements is used to store the word segment in the position once removed from the most significant word segment position, and so on to the eighth storage element which is used to store the word segment in the least significant position of all of the words to be stored. When the memory is accessed for reading, the data output from the several individual storage elements is assembled by appropriate circuitry into a word according to this exemplar ordering of word segments. For a read/write memory, the data words input to the memory as a whole must be separated into word segments and the individual word segments distributed, or "steered," for storage to the appropriate individual storage elements by appropriate circuitry according to the same ordering scheme adopted for read-out which may be the exemplar scheme given above.

For the example of a 288 × 8 memory using 16 256 × 1 storage elements, a nine-bit memory address signal is required to uniquely identify each word. The eight least significant bits of the memory address signal, or their equivalent, are supplied as an element address signal to all of the 16 storage elements. For the first 256 states of the memory address signal, where the most significant bit of that signal is in its first state, data is read out of or written into a first set of eight of the storage elements. For an additional 32 states of the memory address signal, where the most significant bit of that signal is in its second state, data is read out of or written into the second set of eight of the 256 × 1 storage elements. The same exemplar ordering scheme for the word segments of all words as discussed above may be used. The modifications to this priorart approach necessary to build the memory in the aforementioned example which uses eight 256 × 1 storage elements in combination with 16 16 × 1 storage elements follow directly from the above discussion and are well known to those of ordinary skill in the art. As a matter of terminology, it should be noted that two physically distinct storage elements may be readily interconnected to form what may be designated and treated as a single storage element. For example, two 16 × 1 storage elements may be interconnected to form either a single 32 × 1 storage element or a single 16 × 2 storage element. As another example, one 256 × 1 storage element may be combined with two 16 × 1 storage elements to form a single odd-sized 288 × 1 storage element which may be used to form an odd-sized memory using prior-art techniques.

SUMMARY OF THE INVENTION

An object of the present invention is to provide odd-sized memories employing a minimum number of storage elements all of which have the same selected capacity.

Another object is to provide odd-sized memories built from a relatively small number of identical even-sized storage elements of a selected capacity.

A further object of this invention is the provision of a method for accessing or addressing odd-sized memories wherein the memory comprises a minimum number of storage elements of a selected capacity wherein all of the storage elements have the same even-sized capacity.

Still another object of this invention is to provide an odd-sized memory assembled from a plurality of storage elements wherein the segments of each addressable word are stored in a subset of the storage elements and wherein the particular subset of storage elements accessed for a given word is determined by the address for that word.

This invention provides an odd-sized memory, i.e., one for the efficient storage of at least W individually addressable words where W is an integer greater than $2^M$ but less than $2^{M+1}$ and M is an integer greater than zero. Also, a method of accessing or addressing a plurality of individual storage elements, all having the same even-sized capacity, is given whereby the elements are caused to operate as an odd-sized memory. Each such storage element has a capacity of $2^M$ individually addressable word segments, where M is any positive integer. The storage elements are divided into a first set of base storage elements and a second set of expansion storage elements. The circuitry interconnecting the storage elements operates on a memory address signal to organize the word segments into groups and map the groups of word segments onto an associated graphic array of rows and columns. For a first portion of the associated array, a portion of the memory address signal is operated upon to prevent access to each base storage element for selected groups of word segments. The array locations which would otherwise correspond to these selected groups are accessed in an expansion memory element instead. For a second portion of the associated array, the element address signal supplied to each base storage element is derived from the memory address signal in a manner which enables access to those selected storage locations for which access is prevented in the first array portion. Access to the expansion storage elements is prevented for the second portion of the array. Put another way, only a subset of all the storage elements used to build a memory in accordance with this invention is accessed for a given state of the memory address. Which particular subset, or combination, of storage elements is accessed for a given memory address is determined by the state of the memory address signal itself. For the purposes of this specification and this invention, "prevention" of access to a selected storage element under predetermined circumstances is equivalent to and is, in effect, the dual of the "enabling" of access to storage elements under all other circumstances where prevention of access is not desired.

BRIEF DESCRIPTION OF THE DRAWINGS

Other Objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 7 is an array representative of a full Class 3 odd-sized memory section;

DESCRIPTION OF THE PREFERRED EMBODIMENTS

For the purposes of describing this invention, it is convenient to regard every odd-sized memory as being associated with a graphic array of rows and columns, the rows comprising groups of individually addressable words, the individual columns comprising all of the word segments in the same relative position of a certain significance within all of the words, and the intersection of a particular row with a particular column comprising a group of word segments all having the same relative position within the words of a row. Each such array may be associated with a complete memory. An array for a complete memory may consist of and be associated with an array for a single full or partial Class N odd-sized memory section or any combination of arrays for full and partial Class N odd-sized memory sections as will be described more fully hereinafter. The number N is a convenient integer, greater than zero, which is a determinant of the memory to be built to accommodate the storage of a given number of words. Every array for either a complete odd-sized memory or for an oddsized memory section has at least $2^N+1$ rows and, in the preferred embodiment of this invention, exactly $2^N+1$ rows. Every array for a full odd-sized memory section has $2^N$ columns. Every array for a partial odd-sized memory section has at least one column but less than $2^N$ columns. These relationships between the number of rows and columns in an array associated with a section, full or partial, do not necessarily apply to arrays for complete memories. That is because a plurality of sections may be combined, as required, to accommodate the specified word size for the complete memory.

Figure 1:
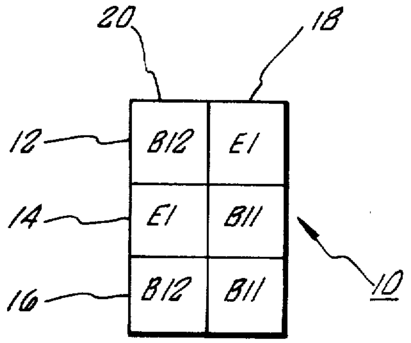
FIG. 1 is an array representative of a full Class 1 odd-sized memory section.

FIG. 1 shows an array 10 for a full Class 1 oddsized memory section having three ($2^1+1$) rows 12, 14 and 16 and two ($2^1$) columns 18 and 20. Every array for an odd-sized memory section is divided into two portions, a base array portion and an expansion array portion. In FIG. 1, the base array portion consists of rows 12 and 14 while the expansion array portion consists of row 16. Every odd-sized memory section is assembled from at least two distinct storage elements at least one of which is designated an expansion storage element and the remainder being designated base storage elements. In the preferred embodiment of this invention, each base storage element stores word segments from only one selected column while an expansion storage element stores word segments from all of the columns of the array for a section.

In the full Class 1 odd-sized memory section associated with the array 10 of FIG. 1, three individual storage elements are used, two base storage elements, designated B11 and B12, and an expansion storage element, designated E1. Base storage element B11 is used to store those word segments of column 18 which intersect with rows 14 and 16. This is indicated in FIG. 1 by the presence of the storage element designator "B11" in those groups, or squares, of the array 10 which are the intersections of rows 14 and 16 with column 18. As an indicated in FIG. 1, the remaining word segments of comumn 18 are stored in the expansion storage element E1. The word segments of column 20 are stored in either base storage element B12 or expansion storage element E1 as indicated by the designators "B12" and "E1" in the squares representing the intersections of rows 12, 14 and 16 with column 20. Any one expansion storage element is never used to store more than one group of word segments from any one column. In all arrays for any full odd-sized memory section, the expansion array portion comprises the rows wherein all word segments are stored in base storage elements only, e.g., row 16 of array 10. The base array portion consists of the remaining rows 12 and 14. The number of rows in the expansion array portion is always equal to the number of expansion storage elements used for both full and partial sections. In the preferred embodiment of this invention, only one expansion storage element is ever used in each full or partial odd-sized memory section and the expansion array portion of all such preferred-embodiment arrays will always consist of one row only.

In FIG. 1, is is convenient to regard the word segments of column 20 as being those positioned in the most significant portion of each word and the word segments of column 18 as being those positioned in the least significant portion of each word. That is simply because of the convention of reading from left to right. However, this is not a requirement. An odd-sized memory can be implemented just as easily with the word segments of column 18 being those in the most significant position of each word. Also, no particular significance should be attached to the fact that the storage assignment of the expansion element E1 in the array 10 appears to lie along a diagonal line descending from the upper right group of the array 10. The storage assignment for E1 could just as well have been made along a diagonal descending from the upper left group of the array 10.

A full or partial Class N odd-sized memory section may be built using C+1 distinct storage elements, each having $2^M$ individually addressable storage locations for word segments therein, where C is the number of columns in the associated section array, C being no greater than $2^N$, and where M is any integer at least as great as N.

For example, to build a full Class 1 odd-sized memory section which maps onto the array 10 of FIG. 1, one might choose to do so using three 16 × 1 storage elements. For these elements, M equals four. This would provide a capacity of 24 × 2. A memory address of M+1 bits, here five bits, is required to uniquely identify the twenty-four words, or word portions, in such a memory section. The number of words, or word portions, mapped onto each of the three rows of the array 10 is equal to $2^{M-N}$, here eight. This number is the same as the number or word segments in a group, as defined above.

When the most significant bit of the five-bit memory address is in its first state, presumably "0", the address is associated with the base array portion, rows 12 and 14, and identifies one of the words mapped thereon for access. When the most significant bit of the memory address is in its second state, presumably "1," the address identifies one of the words mapped onto the expansion array portion, row 16, for access. Since identification for access of either the base array portion, rows 12 and 14, or the expansion array portion, row 16, is accomplished unambiguously by reference to the most significant bit only of the memory address, address bits of lesser significance are used to uniquely identify the individual rows 12 and 14, of the base array portion and the individual words mapped into each row of the entire array 10. Since any Class 1 memory section has only two rows, rows 12 and 14 in array 10, in the base array portion thereof, only one bit of the memory address is required for unambiguously identifying a particular row, 12 or 14, of that base array portion. In the preferred embodiment of this invention, the second most significant bit of the memory adddress is used for this row identification. The remaining three bits of the 5-bit memory address are used to uniquely identify for access one of the eight words mapped into any identified row of the array 10.

The above approach to analyzing the effects, for identification purposes, of the various portions of the (M+1)-bit memory address lends itself to regarding that address as being divided into three mutually exclusive parts. One bit of the address, preferably the most significant bit, may be termed the expansion address. The state of the expansion address identifies either the base array portion or the expansion array portion for access. For a Class N odd-sized memory section, N bits of lesser significance out of the M remaining bits of the memory address are used to unambiguously identify one of the rows of the base array portion for access. This N-bit address portion, preferably the N bits immediately adjacent the most significant bit, may be termed the row address. The number of bits used as the row address is always equal to N in the preferred embodiment of this invention. For the Class 1 array 10 of FIG. 1, the row address has one bit, as indicated above. The remaining M−N least significant bits of an (M+1)-bit memory address may be termed the common address. Its $2^{M-N}$ possible states can unambiguously identify an individual one of the $2^{M-N}$ words mapped into each row of the array. For the example where 16 × 1 storage elements are used in a Class 1 odd-sized memory section, the common address has three bits since M equals four and N equals 1.

Figure 2:
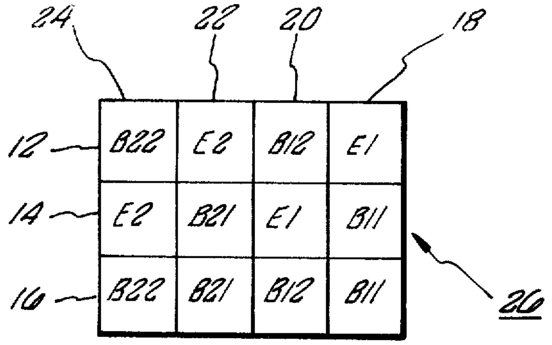
FIG. 2 is an array representative of the combination of two full class 1 odd-sized memory sections.

While an array for a full Class N odd-sized memory section is restricted to having no more than $2^N$ columns therein, and therefore no more than $2^N$ word segments per word, an array for a complete odd-sized memory has no such restriction. That is because any number of section arrays and any number of associated odd-sized memory sections of the same class may be combined to accommodate the storage of words of any desired length. FIG. 2 shows an array 26 for an odd-sized memory which is simply the combination of two arrays of the type shown in FIG. 1. Columns 18 and 20 are associated with a first full Class 1 odd-sized memory section while columns 22 and 24 are associated with a second full Class 1 odd-sized memory section. As before, the combination array 26 has three, or $2^1+1$, rows 12, 14 and 16 each spanning all of the columns 18, 20, 22 and 24. Each half of the array 26 has two base storage elements (B11 and B12 for one half and B21 and B22 for the other half) and one expansion storage element (E1 for one half and E2 for the other half) associated therewith.

Figure 3:
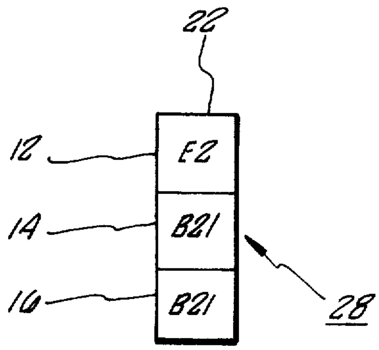
FIG. 3 is an array representative of a partial Class 1 odd-sized memory section.

An array for a partial Class N odd-sized memory section has at least one but fewer than $2^N$ columns. FIG. 3 illustrates an array 28 for a partial Class 1 odd-sized memory section. It consists of only one column 22 and the three rows 12, 14 and 16. The array 28 is, in effect, just that column 22 of the array 26 of FIG. 2 which is associated there with the second full Class 1 odd-sized memory section. For the array 28, only one base storage element, B21, and one expansion storage element, E2, is required. The latter will have one group of unused word segments.

Figure 4:
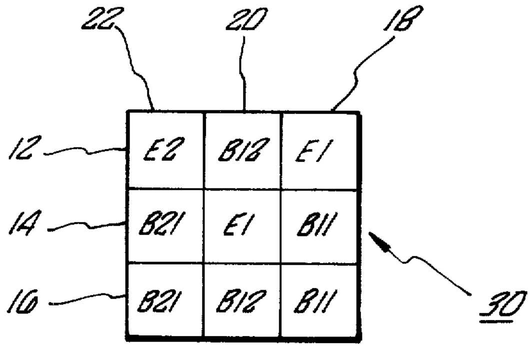
FIG. 4 is an array representative of the combination of a full Class 1 odd-sized memory section with a partial Class 1 odd-sized memory section.

In FIG. 4, there is shown an array 30 which is associated with the combination of a full Class 1 odd-sized memory section, such as the array 10 of FIG. 1, with a partial Class 1 odd-sized memory section, such as the array 28 of FIG. 3.

There has thus been illustrated the manner in which the arrays associated with full or partial odd-sized memory sections may be formed and combined to accommodate varying complete memory sizes. While no specific illustration has been given for the combination of two or more arrays all of which are associated with partial sections, it is self-evident that this too may be done if desired.

Figure 5:
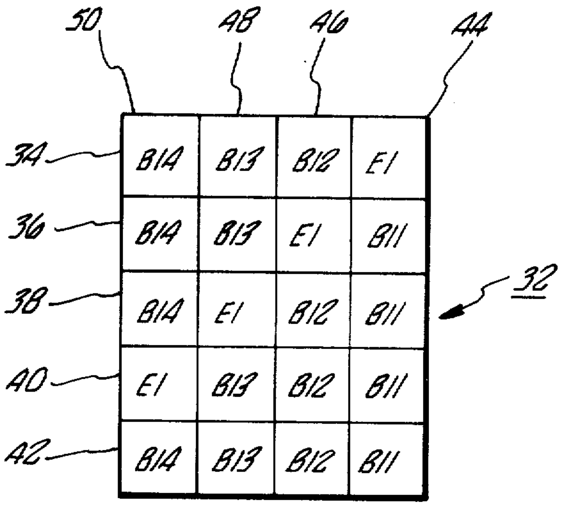
FIG. 5 is an array representative of a full Class 2 odd-sized memory section.

FIG. 5 shows an array 32 for a full Class N odd-sized memory section where N is equal to 2. It has five ($2^2$+1) rows 34, 36, 38, 40 and 42, four ($2^2$) columns 44, 46, 48 and 50. Four ($2^2$) rows 34, 36, 38 and 40 comprise the base array portion thereof and one row 42 comprises the expansion array portion thereof. Four base storage elements, B11, B12, B13 and B14, are associated with the individual columns 44, 46, 48 and 50, respectively, while one expansion storage element, E1, is associated with the base array portion. If, for example, five 256 × 1 (M=8) storage elements were operatively interconnected to form a full Class 2 odd-sized memory section, the section would have a capacity of 320 × 4. A memory address of at least nine (M+1) bits would be required to unambiguously identify each of the words. The memory address could be regarded as being divided into three parts, an expansion address of one bit, a row address of 2 (N) bits for the four ($2^2$) rows of the base array portion and a common address of six (M−N) bits for the 64 ($2^6$) words in each row.

Figure 6:
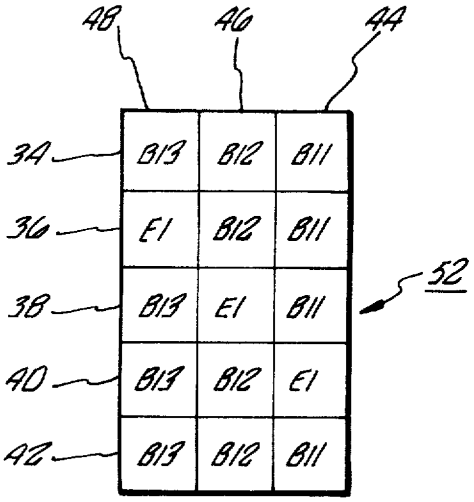
FIG. 6 is an array representative of a partial Class 2 odd-sized memory section having three columns.
Figure 1:
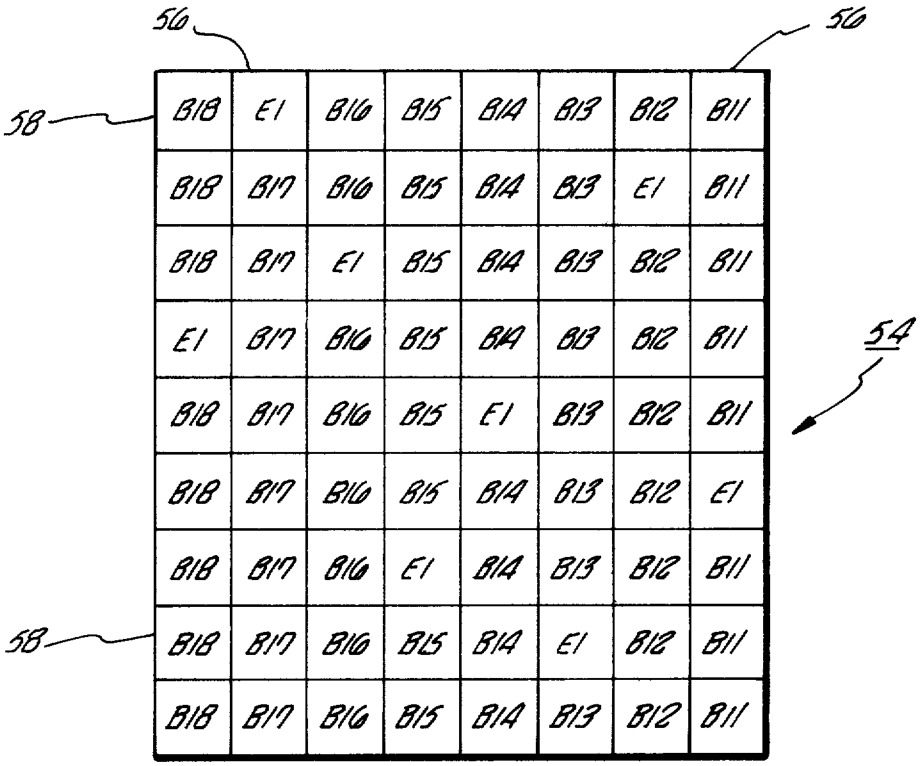

FIG. 6 shows an array 52 for a partial Class 2 odd-sized memory section having three columns 44, 46 and 48. One column 50 from the array 32 of FIG. 5 is eliminated, along with the associated base storage element B14, to form the array 52 of FIG. 6.

The manner in which the designators B11, B12, B13 and E1 for the storage elements associated with the array 52 are distributed in FIG. 6 illustrates the aforementioned situation wherein the assignment of groups of word segments to the expansion storage elements, E1, is distributed along a diagonal descending from the upper left rather than from the upper right. To express the concept of this variation in another way, let us assume that array 52 is ordered from top to bottom in such a way that each succeeding word is associated with an address having a numerical value which is one bit greater than the preceding word. As addresses are incremented from smaller to larger values, the choice of whether to first assign the lowest significance word segments or to first assign the highest significance word segments to an expansion storage element is of no consequence. Either approach is equally acceptable. In fact, implementation of this invention is made just as readily when the selection of the order in which groups of word segments are assigned to be stored in an expansion storage element is made at random. Such a random selection is illustrated in FIG. 7 which shows an array 54 for a full Class 3 odd-sized memory section. Note in FIG. 7 that the designator E1 for the assignment of groups of word segments does not lie along any line nor is the pattern of distribution of any significance. It is merely necessary to follow the rule that each column 56 of the array 54 must have at least one group of $2^{M-N}$ word segments assigned to an expansion storage element for storage and that each row 58 must have no more than one group of $2^{M-N}$ word segments assigned to any one expansion storage element.

Figure 8:
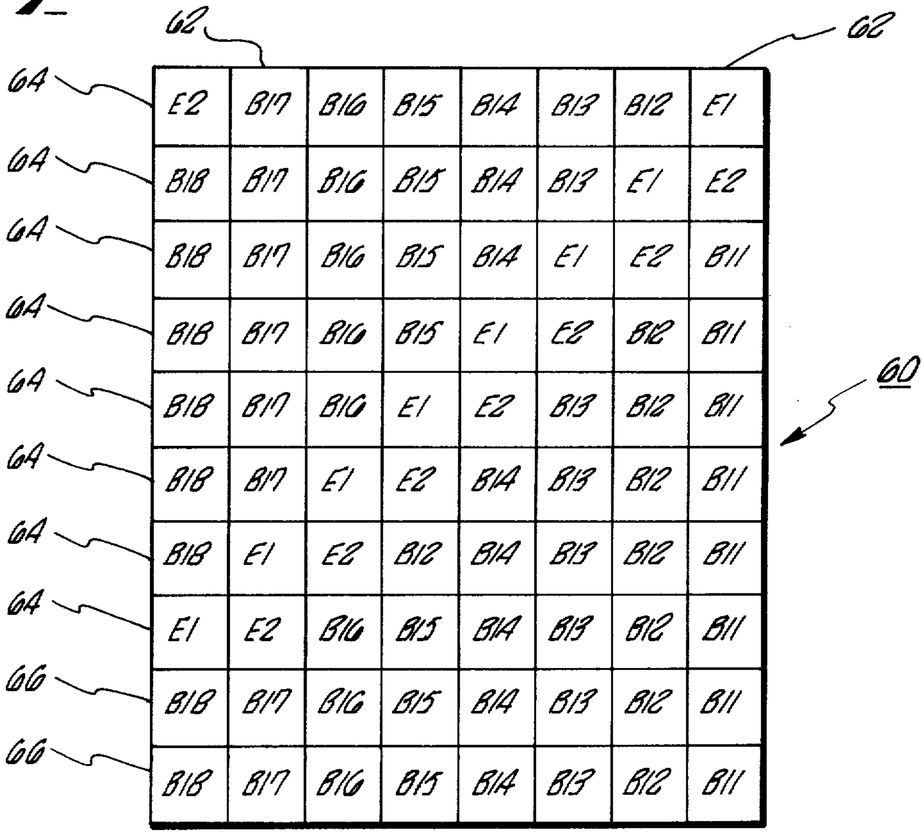
FIG. 8 is an array representative of a full Class 3 odd-sized memory section having more than one row in the expansion array portion thereof.

FIG. 8 shows an array 60 for a full Class 3 (N=3) odd-sized memory section having eight ($2^3$) columns 62, 8 ($2^3$) rows 64 in the base array portion thereof and two rows 66 in the expansion array portion thereof. It is consistent with this invention for an array for a Class N odd-sized memory section to have as many as $2^{N+1}-1$ rows altogether of which $2^N$ rows comprise the base array portion, as always, and $2^N-1$ rows comprise the expansion array portion. In the array 60, only two rows 66 of the seven ($2^3-1$) which are permissible for the expansion array portion are used for the purpose of illustration. As before, the number of expansion storage elements, have two, used for storing word segments in the base array portion is the same as the number of rows 66 in the expansion array portion. The two expansion storage elements associated with the array 60 are designated E1 and E2, each of the designators appearing in the array 60 of FIG. 8 only once in each column and only once in each row. This is consistent with the rule stated above for the assignment of groups of word segments to expansion storage elements.

As before, eight ($C=2^3$) base storage elements, designated B11 through B18, are used in the full Class 3 oddsized memory section associated with the array 60 of FIG. 8. Each one of these base storage elements is associated with only one of the columns 62. It should be noted, however, that wherever an odd-sized memory section having a plurality of expansion storage elements could be used, an equal amount of memory capacity can be provided by using combinations of full and partial odd-sized memory sections restricted to having only one expansion storage element in each such section.

Figure 9:
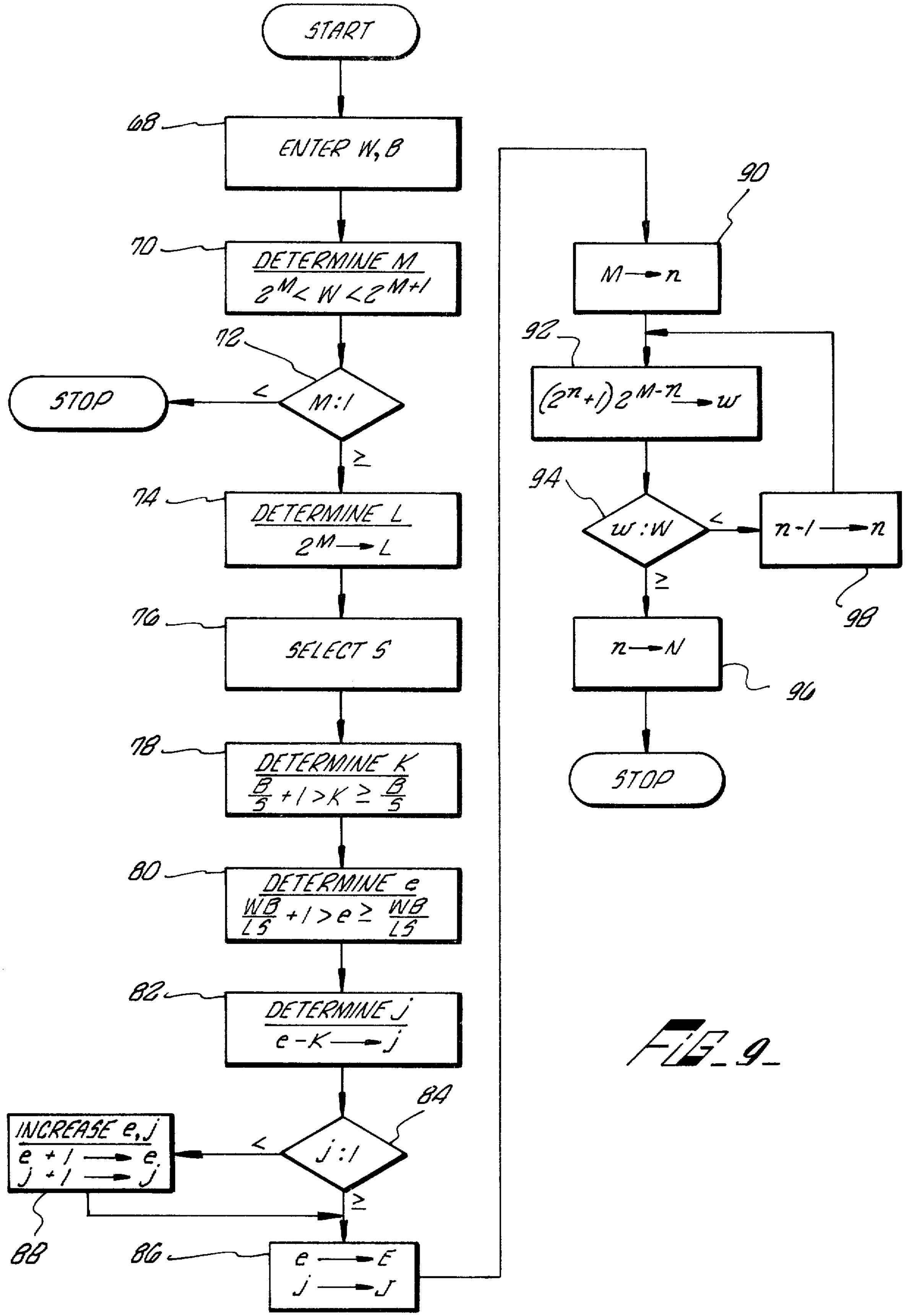
FIG. 9 is a flow diagram of an algorithm useful for designing odd-sized memories.

In the discussion of this invention up to this point, the emphasis has been on the arrays associated with odd-sized memories and the distribution of storage among the several storage elements comprising the memory. However, unless the choice of arrays and associated odd-sized memory sections is obvious, a memory designer would have to calculate certain parameters before proceeding to implement this invention. FIG. 9 gives an algorithm for computing these parameters. The following is a list of the symbols used in the flow chart of FIG. 9 along with their definitions and certain explanatory remarks.

B — the largest number of bits in any word for which storage is required to be provided in an individually addressable location of the complete odd-sized memory (a predetermined specification).

E — the minimum number of storage elements required to implement the complete odd-sized memory.

*e* — trial value for E.

J — the minimum number of expansion storage elements required to implement the complete odd-sized memory; the minimum number of full and partial odd-sized memory sections required.

*j* — trial value for J.

K — the minimum number of columns required for the array associated with the complete oddsized memory; the minimum number of base storage elements required to implement the complete odd-sized memory; the number of word segments comprising a word.

L — the number of individually addressable storage locations in the storage elements to be used in implementing the odd-sized memory.

M — the minimum number of element address bits required to unambiguously identify each individual storage location in a storage element having L such storage locations.

N — the minimum number of address bits required to unambiguously identify each individual row in the base array portion of an array for a Class N odd-sized memory.

*n* — trial value for N.

S — the number of bits storable in each individually addressable storage location of each of the storage elements to be used in implementing the odd-sized memory; the number of bits in a word segment (a matter of designer option in some cases).

W — the total number of words for which individually addressable storage locations are required to be provided in the odd-sized memory (a predetermined specification).

*w* — interim value for W. All of the parameters and variables listed above are positive integers greater than zero.

The following additional remarks related to the algorithm of FIG. 9 are intended to assist a memory designer in its use. FIG. 9 is otherwise self-explanatory to those of ordinary skill in the art. Each of the following remarks is preceded by the same reference numeral used in FIG. 9 to identify the various parts of the algorithm to which the remark pertains.

70: M is always chosen to be that integer which makes $2^M$ the largest possible number less than W obtainable by raising two to an integer exponential power.

72: one— and two—word memories are trivial cases.

74: If there is no physically distinct storage element having L individually addressable locations which the designer is willing or able to use, composite storage elements having L individually addressable locations formed by intercoupling smaller capacity elements which are acceptable are used.

76: Where more than one type of storage element having L individually addressable locations is available and the difference between the elements is in the number of bits, S, storable in each location, the designer may wish to examine the different designs resulting from using each of the different types of elements.

Three examples are presented herein for illustrating the calculations of the algorithm of FIG. 9 for three different odd-sized memory capacities. In the presentation of these examples, the numerals appearing in parentheses after the designators for stop numbers and the numerals appearing in "proceed to" statements refer to the reference numerals used in FIG. 9 for the various parts of the algorithm.

EXAMPLE 1—A 320 × 4 MEMORY

| | | | |
|---|---|---|---|
| Step | 1 | (68): | W = 320 |
| | | | B = 4 |
| Step | 2 | (70): | $2^8 = 256 < 320 < 512 = 2^9$ |
| | | | M = 8 |
| Step | 3 | (72): | M ≧ 1, proceed to 74 |
| Step | 4 | (74): | $2^8 = 256 = L$ |
| Step | 5 | (76): | Let S = 1, use a 256 × 1 element |
| Step | 6 | (78): | 4÷1 = 4 = K |
| Step | 7 | (80): | (320 × 4)÷(256 × 1) = 5 = e |
| Step | 8 | (82): | 5−4 = 1 = j |
| Step | 9 | (84): | 1 ≧ 1, proceed to 86 |
| Step | 10 | (86): | E = 5 |
| | | | J = 1 |
| | | | Only one odd-sized memory section is required using four base storage elements and one expansion storage element. |
| Step | 11 | (90): | 8 = n |
| Step | 12 | (92): | $(2^8+1)(2^{8-8}) = 257 \times 1 = W$ |

EXAMPLE 1 – Continued

| | | | |
|---|---|---|---|
| Step | 13 | (94): | 257<320, proceed to 98 |
| Step | 14 | (98): | 7 = n |
| Step | 15 | (92): | $(2^7+1)(2^{8-7})$ = 129 × 2 = 258 = w |
| Step | 16 | (94): | 258<320, proceed to 98 |
| Step | 17 | (98): | 6 = n |
| Step | 18 | (92): | $(2^6+1)(2^{8-6})$ = 65 × 4 = 260 × w |
| Step | 19 | (94): | 260<320, proceed to 98 |
| Step | 20 | (98): | 5 = n |
| Step | 21 | (92): | $(2^5+1)(2^{8-5})$ = 33 × 8 = 264 = w |
| Step | 22 | (94): | 264<320, proceed to 98 |
| Step | 23 | (98): | 4 = n |
| Step | 24 | (92): | $(2^4+1)(2^{8-4})$ = 17 × 16 = 272 = w |
| Step | 25 | (94): | 272<320, proceed to 98 |
| Step | 26 | (98): | 3 = n |
| Step | 27 | (92): | $(2^3+1)(2^{8-3})$ = 9 × 32 = 288 = w |
| Step | 28 | (94): | 288<320, proceed to 98 |
| Step | 29 | (98): | 2 = n |
| Step | 30 | (92): | $(2^2+1)(2^{8-2})$ = 5 × 64 = 320 = w |
| Step | 31 | (94): | 320 ≧ 320, proceed to 96 |
| Step | 32 | (96): | N = 2 |

Use one full Class 2 odd-sized memory section.

EXAMPLE 2—A 320 × 6 MEMORY

| | | | |
|---|---|---|---|
| Step | 1 | (68): | W = 320<br>B = 6 |
| Steps 2–5 in Example 2 are identical to steps 2–5 in Example 1. | | | |
| Step | 6 | (78): | 6÷1 = 6 = K |
| Step | 7 | (80): | (320 × 6)÷(256 × 1) = 7.5<br>e = 8 |
| Step | 8 | (82): | 8−6 = 2 = j |
| Step | 9 | (84): | 2 ≧ 1, proceed to 86 |
| Step | 10 | (86): | E = 8<br>J = 2<br>Two odd-sized memory sections are required using six base storage elements and two expansion storage elements. |

Steps 11–32 in Example 2 are identical to steps 11–32 in Example 1.

Use either one full Class 2 odd-sized memory section combined with one partial Class 2 odd-sized memory section or two partial Class 2 odd-sized memory sections.

EXAMPLE 3—A 320 × 9 MEMORY

| | | | |
|---|---|---|---|
| Step | 1 | (68): | W = 320<br>B = 9 |
| Steps 2–4 in Example 3 are identical to steps 2–4 in Example 1. | | | |
| Step | 5 | (76): | Let S = 4, use a 256 × 4 element |
| Step | 6 | (78): | 9÷4 = 2.25<br>K = 3 |
| Step | 7 | (80): | (320 × 9)÷(256 × 4) = 2.8125<br>e = 3 |
| Step | 8 | (82): | 3−3 = 0 = j |
| Step | 9 | (84): | 0<1, proceed to 88 |
| Step | 10 | (88): | e = 3+1 = 4<br>j = 0+1 = 1 |
| Step | 11 | (86): | E = 4<br>J = 1<br>Only one odd-sized memory section is required using three base storage elements and one expansion storage element. |

Steps 12–33 in Example 3 are identical to steps 11–32 in Example 1.

Use one partial Class 2 odd-sized memory section.

Figure 10:
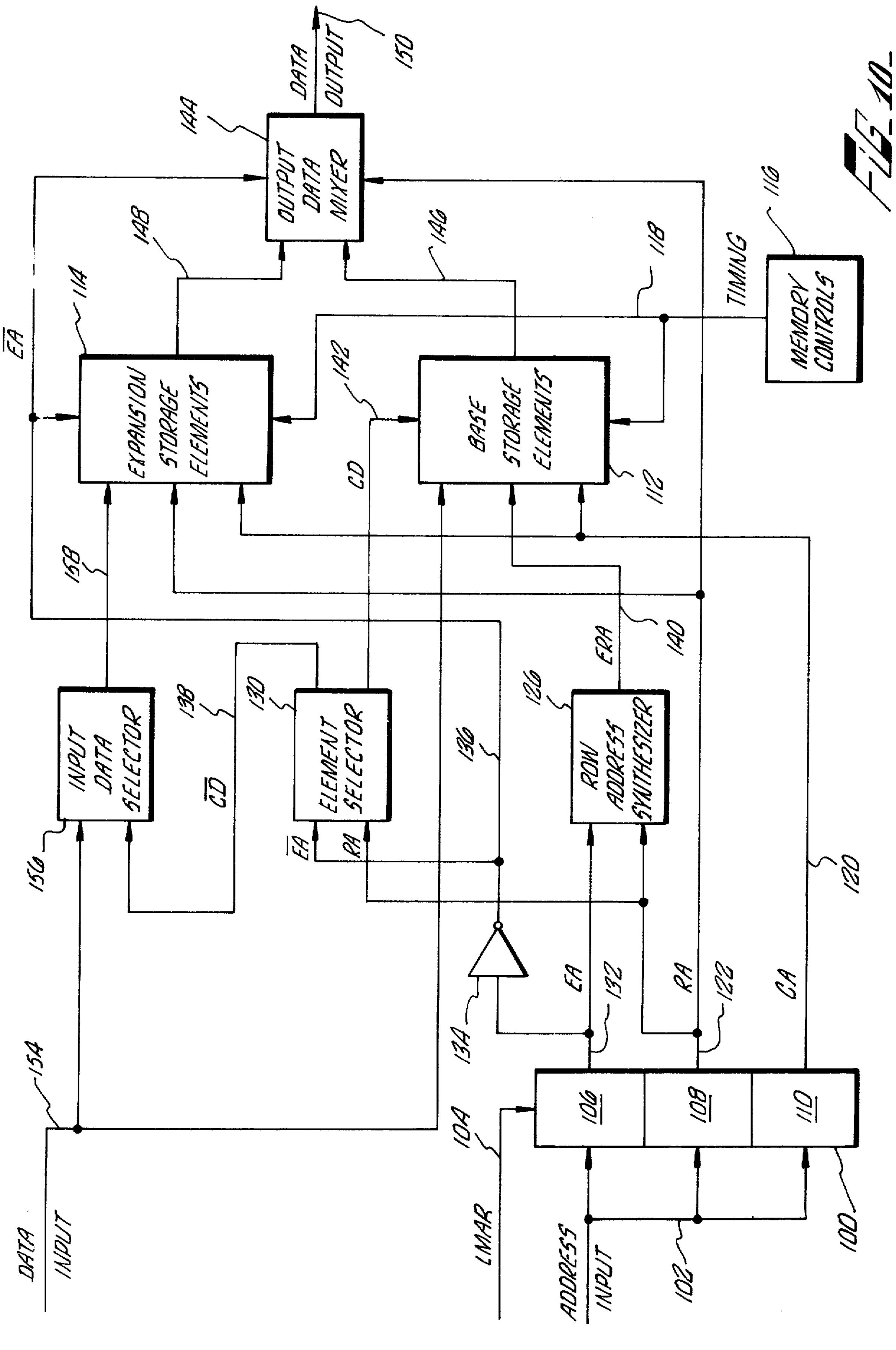
FIG. 10 is a functional block diagram of a generalized Class N odd-sized memory section.

FIG. 10 is a simplified block diagram of those portions of an odd-sized memory which are required to be discussed for an understanding of this invention. Other functional elements such as operational and interface controls which are commonly implemented to couple the memory to a larger data processing system are not shown since such implementation is the same here as for prior-art memories using similar storage elements and is well understood by those having ordinary skill in the art.

In FIG. 10, there is shown a memory address register 100 which stores the memory address signal appearing on line 102 when an LMAR (load memory address register) signal from the operational controls (not shown) appears on line 104. The memory address register 100 is depicted as being divided into three mutually exclusive portions, an expansion address register 106 for the most significant bit of the memory address, a row address register 108 for the next N most significant bits and a common address register 110 for the M−N least significant bits. The actual storage of data is accomplished in the base storage elements 112 and the expansion storage elements 114. All of the storage elements 112 and 114 are supplied with timing signals on line 118 from the memory controls 116. The timing signals on line 118 determine when data may be read out of the storage elements 112 and 114 and, if the memory is a read/write memory, when input data may be written into the storage elements 112 and 114. Ordinarily, the memory controls 116 will receive a signal from the operational controls (not shown) to initiate a cycle involving the transfer of information into or out of storage, or both.

The identification for access of storage locations in the several storage elements 112 and 114 is accomplished, in part, by the common address signal, CA, output from the common address register 110 on line 120 and supplied thereby to all of the base storage elements 112 and all of the expansion storage elements 114. The identification for access of storage locations in the expansion storage elements 114 is completed by supplying them with a row address signal, RA, output from the row address register 108 on line 122. The identification for access of storage locations in the base storage elements 112 is completed by supplying them with an expansion row address signal, ERA, output from the row address synthesizer 126 on line 140. The row address synthesizer 126 produces ERA by operating on two signals input thereto: RA supplied from the row address register 108 on line 122 and EA, the expansion address signal, supplied from the expansion address register on line 132. The operation of the row address synthesizer 126 will be explained more fully hereinafter in connection with FIG. 11.

A signal $\overline{EA}$, corresponding to the logical negation of EA, is produced on line 136 as the output of the inverting buffer amplifier 134, the amplifier 134 having EA as its input. $\overline{EA}$ is supplied to the expansion storage elements 114 to enable access to identified storage locations therein when EA is false, or 0, or, conversely, to prevent access thereto when EA is true, or 1. $\overline{EA}$ is also supplied, along with RA, to the element selector 130. The element selector 130 operates on $\overline{EA}$ and RA to produce an output signal, CD, on line 142 which is supplied to the base storage elements 112 to enable them for access to identified storage locations therein for selected states of ERA when EA is false and for any state of ERA when EA is true.

For memory read-out, data from identified storage locations in the base storage elements 112 is supplied on line 146 and data from identified storage locations in the expansion storage elements 114 is supplied on line 148 to the output data mixer 144. The output data mixer also has both $\overline{EA}$ and RA supplied to it as control signals. When $\overline{EA}$ is true, any particular word identified for read-out by a memory address will have at least one word segment to be read from one of the expansion storage elements 114 and other word segments to be read from one or more base storage elements 112. When $\overline{EA}$ is false, all of an addressed word is read from the base storage elements 112. The output data mixer 144 uses $\overline{EA}$ and RA in a manner which causes the several word segments of the word addressed to be selected from the correct pre-assigned storage elements and assembled to form the output data word on line 150.

For a read-only memory, nothing more is required. However, for a read/write memory, the several word segments of an input data word on line 154 must be routed, or "steered," to the identified storage locations in their pre-assigned storage elements 112 and 114. The steering of selected word segments to the expansion storage elements 114 is accomplished in the input data selector 156. The input data selector 156 receives all of the input data. A control signal, $\overline{CD}$, supplied on line 138 by the element selector 130 is used in the input data selector 156 to steer selected word segments to the expansion storage elements 114 on line 158. All of the input data is also routed to the base storage elements 112. The remaining word segments are stored in identified storage locations in those base storage elements 112 enabled by the signal CD supplied thereto on line 142 from the element selector 130.

Figure 11A:
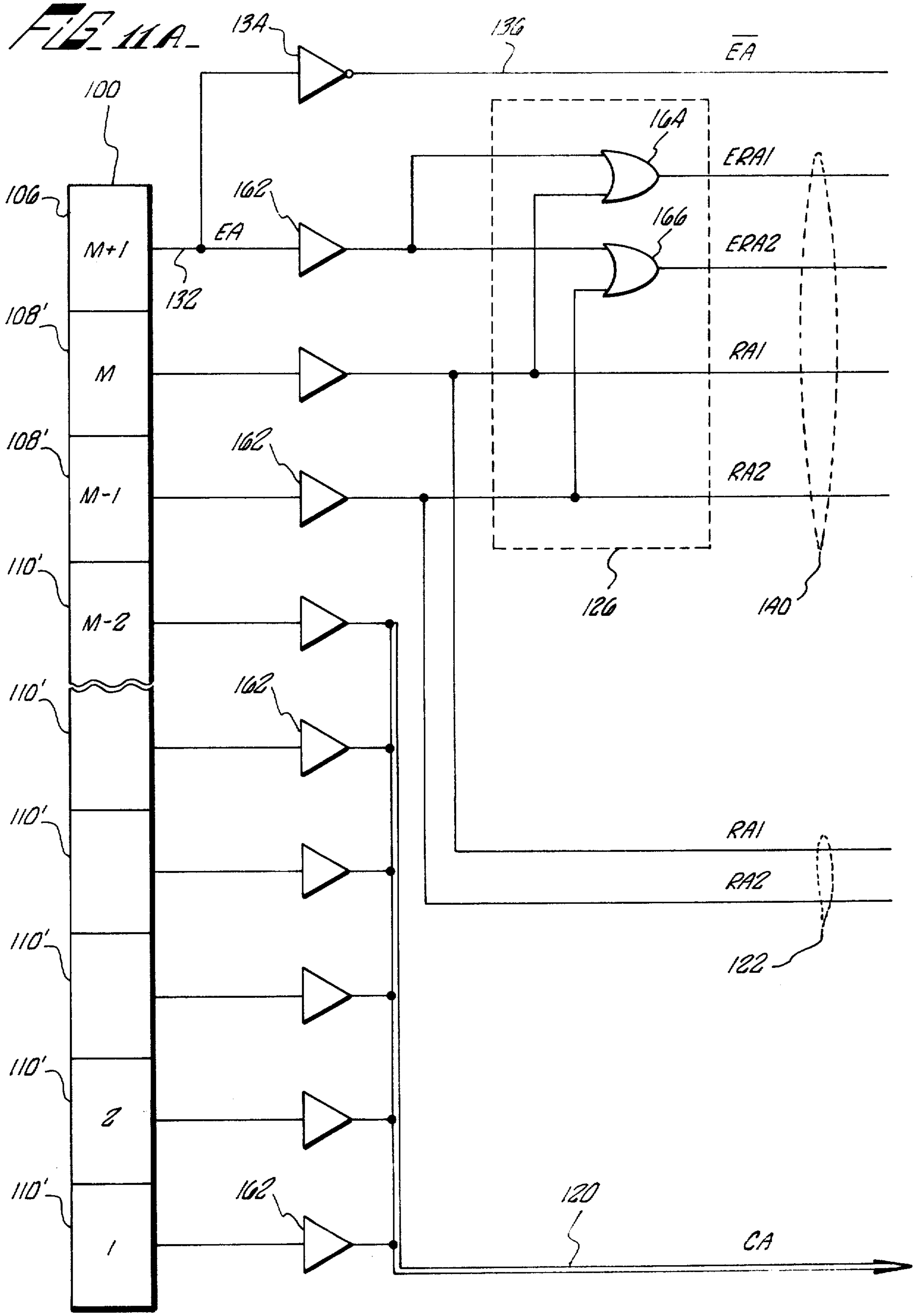
FIGS. 11A, 11B and 11C show a logic diagram for a generalized full Class 2 odd-sized memory section.
Figure 11B:
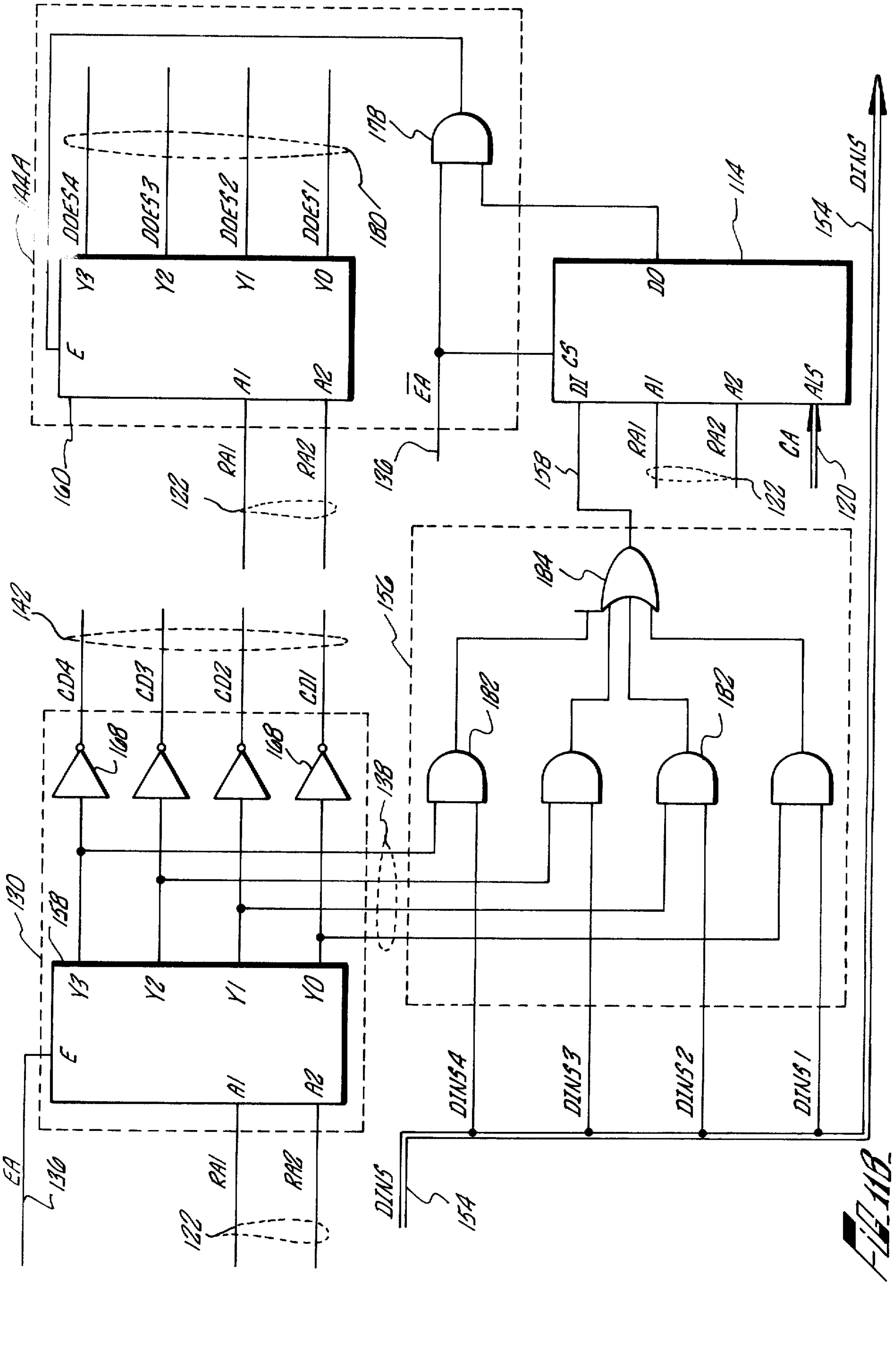
Figure 11C:
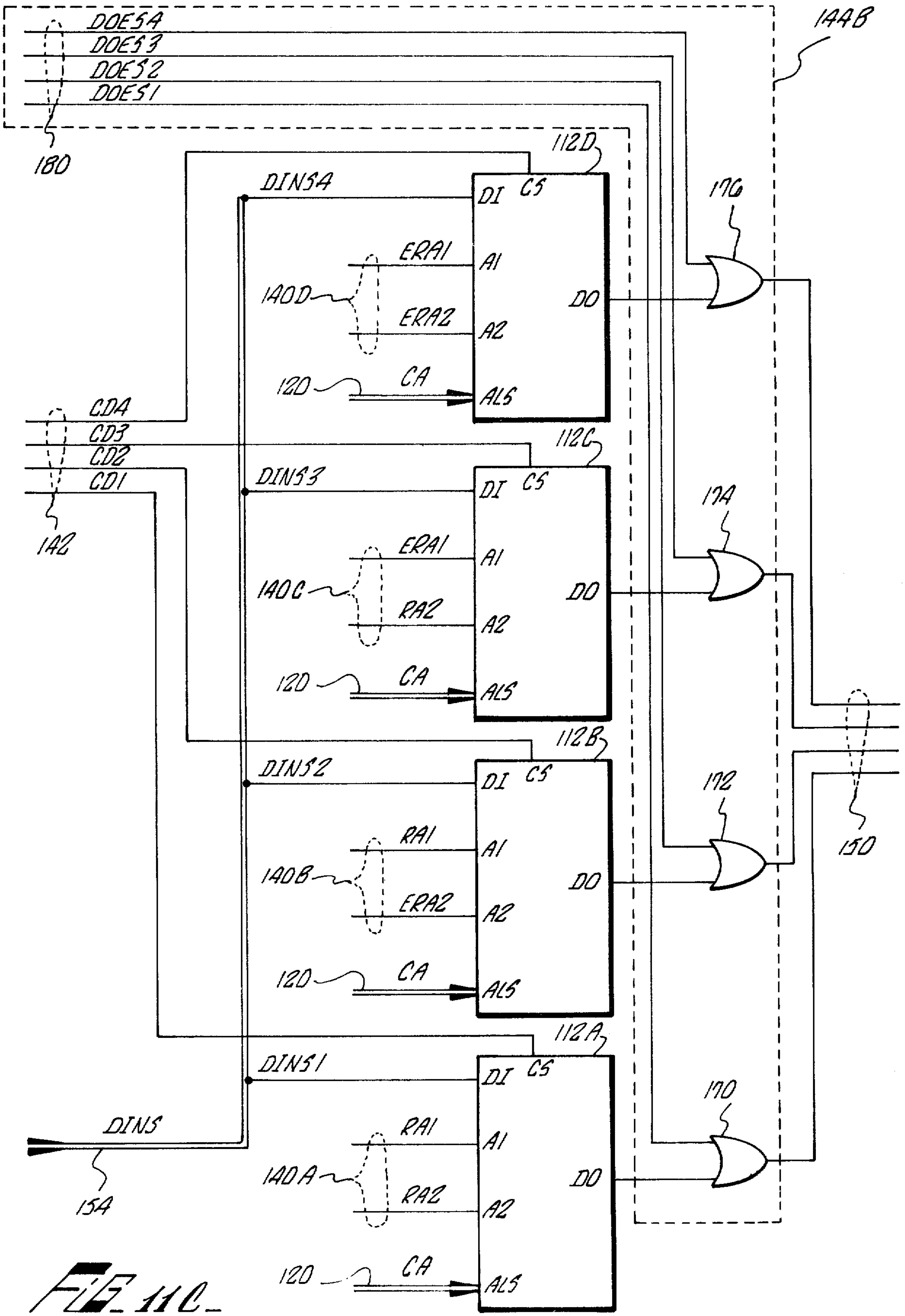

FIGS. 11A, 11B and 11C jointly present a detailed logic diagram for a generalized full Class 2 odd-sized memory section having all of the functions discussed above in connection with FIG. 10. The diagram is generalized in the sense that it applies to any full Class 2 odd-sized memory section, ie., one which uses storage elements having at least four individually addressable locations therein. It is further generalized in the sense that the various functional elements, including the storage elements, depicted in FIGS. 11A, 11B and 11C do not precisely represent any particular commercially available, standard or catalog parts. Therefore, certain minor details may have to be changed to implement a memory using the concepts discussed here and other details will have to be supplied. However, these details will be readily apparent to those skilled in the art. For example, load resistors and connections to power supplies are not shown.

It should also be noted that the logic diagram of FIGS. 11A, 11B and 11C is for a memory which operates in parallel. That is, each data bit and each address bit is distributed simultaneously on its own conductors. However, the concepts given here are equally applicable to bit-serial memories with appropriate modifications.

The logic symbols used to depict the base storage elements 112A, 112B, 112C and 112D (FIG. 11C) and the expansion storage element 114 (FIG. 11B) are intended to represent storage elements similar, but not identical, to the Texas Instruments Type SN74S206 Read/Write Memories mentioned above. The primary differences are in what shall be regarded here as the relative polarity of the input and output signals. Such storage elements include, in addition to the storage cells themselves, address decoders, buffers and inverters, data input and write buffers, and write and sense amplifiers. The logic symbols used here for the storage elements 112A, 112B, 112C, 112D and 114 have two separate address inputs, designated A1 and A2, indicated for the two most significant bits of an element address signal. An indeterminate number of additional address inputs for the least significant bits of the element address signal, for elements having more than four individually addressable storage locations, are indicated by the symbol ALS. Data is input at the terminal indicated by the symbol DI and output at the terminal indicated by the symbol DO. Provision for a single memory-enable signal input is indicated by the symbol CS. For the storage elements represented by these logic symbols, output data has the same polarity as input data, i.e., and input data signal at the "true" voltage level will produce an output data signal at the true voltage level also upon reading the stored data. Input data will be stored only when the memory-enable signal at CS is at the true voltage level. The signal at DO is fixed at the "false" voltage level whenever the memory-enable signal at CS is at the false voltage level.

The logic symbols 158 and 160 shown as part of the element selector 130 and of the output data mixer portion 144A, respectively, in FIG. 11B are each intended to represent two-line to four-line decoder/demultiplexer units. The decoder/demultiplexer units 158 and 160 are similar, but not necessarily identical, to those in Part No. SN74S139 shown and described on pp. 274–277 of the aforementioned catalog. Each of the units 158 and 160 has an input for an enable signal designated by the symbol E, two inputs for address bit signals designated by the symbols A1 and A2, and four outputs designated Y0, Y1, Y2 and Y3. All of the outputs are at the false voltage level when the enable signal input at E is at the false voltage level. When the enable signal input at E is at the true voltage level, one and only one of the outputs Y0, Y1, Y2 or Y3 will be at the true voltage level, a different one of said outputs being at the true voltage level for each different one of the four possible states assumed by the pair of signals input at A1 and A2.

In FIG. 11A, the memory address register 100 has a storage capacity of M+1 bits. The expansion address, consisting of the most significant bit, is stored in cell 106. The two bits of the row address are stored in the two cells 108'. The M–2 bits of the common address are stored in the cells 110'. A signal corresponding to the state of each of the cells 106, 108' and 110' of the address register 100 is supplied to the remainder of the memory section through buffer amplifiers 162. The common address signal, CA, is transmitted by the cable 120 to the expansion storage element 114 in FIG. 11B and to each of the base storage elements 112A, 112B, 112C and 112D in FIG. 11C as part of the element address signal for each of those elements. The expansion address signal EA on line 132 is coupled to the inverting buffer amplifier 134 to produce the signal $\overline{EA}$ on line 136. $\overline{EA}$ is supplied to the CS input of the expansion storage element 114 in FIG. 11B and serves as the memory-enable signal for that element. The expansion storage element is thereby enabled for read/write operation when address register cell 106 is in its false state and disabled when cell 106 is in its true state. $\overline{EA}$ is also supplied to the E input of the decoder 158 in the element selector 130 of FIG. 11B. The decoder 158 is thereby enabled when address register cell 106 is in its false state and disabled when cell 106 is in its true state.

The row address signal RA, consisting of the two address bits RA1 and RA2, is supplied on cable 122 to the address input terminals A1 and A2, respectively, of the expansion storage element 114 in FIG. 11B. RA1 and RA2, along with CA, supply the expansion storage element 114 with an M-bit element address signal. Cable 122 also supplies RA1 and RA2 as input signals to the input terminals A1 and A2, respectively, of the decoder 158 in the element selector 130 in FIG. 11B and to the input terminals A1 and A2, respectively, of the demultiplexer 160 of the output data mixer portion 144A shown in FIG. 11B.

EA, RA1 and RA2 are also supplied to the row address synthesizer 126 in FIG. 11A. In the row address synthesizer 126, EA and RA1 are supplied as inputs to an OR gate 164 which has ERA1 as its output and EA and RA2 are supplied as inputs to another OR gate 166 which has ERA2 as its output. The row address synthesizer 126 has four output signals, ERA1, ERA2, RA1 and RA2, each of which is transmitted, via the able 140, to an address input, A1 or A2, of at least two of the base storage elements 112A, 112B, 112C, and 112D in FIG. 11C. ERA1 and RA1 have the same state, true or false, when EA is false, but ERA1 is true regardless of the state of RA1 when EA is true. Similarly, ERA2 and RA2 have the same state, true or false, when EA is false, but ERA2 is true regardless of the state of RA2 when EA is true. The following distribution of the four address signals output from the row address synthesizer 126 is made to the four base storage elements 112A, 112B, 112C and 112D as is indicated in FIG. 11C. RA1 and RA2 are supplied to the input terminals A1 and A2, respectively, of storage element 112A on cable 140A. RA1 and ERA2 are supplied to the input terminals A1 and A2, respectively, of storage element 112B on cable 140B. ERA1 and RA2 are supplied to the input terminals A1 and A2, respectively, of storage element 112C on cable 140C. ERA1 and ERA2 are supplied to the input terminals A1 and A2, respectively, of storage element 112D on cable 140D. Each of the four base storage elements 112A, 112B, 112C and 112D are thereby supplied with a different synthesized two-bit row address signal which, together with CA, provides each of these elements with an M-bit element address signal. With this arrangement, all of these four two-bit row address signals are identical to each other and are also identical to the row address signal, RA1 and RA2, supplied to the expansion storage element 114 in FIG. 11B when EA is in its false state. However, in the preferred embodiment of this invention, both RA1 and RA2 are required to assume only their false state when EA is true for valid memory address signals. Therefore, for the distribution of address signals from the row address synthesizer 126 (FIG. 11A) given here, each of the four base storage elements 112A, 112B, 112C and 112D is supplied with a different two-bit row address when EA is in its true state. Furthermore, each of these four different 2-bit row address signals corresponds to a different one of the four possible states which can be assumed by a 2-bit signal. The particular synthesized tow-bit row address signal which is supplied to each of the several base storage elements 112A, 112B, 112C and 112D when EA is in its true state is the same as the row address signal supplied to each of these storage elements when EA is in its false state and the individual storage element is disabled. This will be more fully discussed hereinafter.

In FIG. 11B, the element selector 130 comprises the decoder 158, discussed above, and four inverting buffer amplifiers 168, each connected to one of the four output terminals, Y0, Y1, Y2 and Y3, of the decoder 158. The four inverting buffer amplifiers 168 each supply separate memory-enable signals, CD1, CD2, CD3 and CD4, on cable 142 to each CS input of each of the four base storage elements 112A, 112B, 112C and 112D (FIG. 11C). When $\overline{EA}$ is true, a different one of these memory-enable signals is made false for each different one of the four possible states of the row address signal, RA1 and RA2, input to the decoder 158 at its address input terminals A1 and A2. Thus, when $\overline{EA}$ is true, there is always one, and only one, base storage element disabled. The connections between the inverting buffer amplifiers 168 of the element selector 130 and the CS inputs of the base storage elements 112A, 112B, 112C and 112D are, and must be, such that the particular state of the row address signal which causes the base storage element to be disabled is identical to the state of the two-bit synthesized row address signal supplied to that same storage element when $\overline{EA}$ is false. When $\overline{EA}$ is false, all of the memory-enable signals on cable 142 remain true because the decoder 158 is then disabled by the signal $\overline{EA}$ input thereto at its E terminal.

In FIG. 11C, there is shown an output data mixer portion 144B which comprises a plurality, here four, of OR gates 170, 172, 174 and 176. Each of these OR gates has two inputs of which one is coupled to receive the output data signal from the DO terminal of one of the base storage elements. For example, the DO terminal of base storage element 112A is coupled to one of the two input terminals of OR gate 170. The DO terminals of all of the storage elements represented in FIG. 11 supply signals at the false voltage level when the storage element is disabled. When the storage element is enabled, those signals are at the false voltage level or the true voltage level upon read-out depending upon the state of the storage cell in the location addressed. The storage elements 112A, 112B, 112C, 112D and 114 of FIGS. 11B and 11C store word segments of length one bit in each addressable storage location thereof. If the storage elements were capable of storing multiple-bit word segments in each such addressable location, then, for parallel operation, the number of OR gates in the output data mixer portion 144B required to be associated with each base storage element would be equal to the number of bits in each such word segment for full utilization of the storage capacity.

The output lines of each of the OR gates 170, 172, 174 and 176 form the output data word cable 150. The cable 150 is coupled to supply the output data word, in parallel, either directly to some other appropriate portion of a data processing system (not shown) for immediate use or to a memory information register (not shown) for short-term storage when a read operation for the storage elements is initiated as discussed above in connection with FIG. 10.

The output data mixer 144 (FIG. 10) also comprises the output data mixer portion 144A shown in FIG. 11B. An AND gate 178 therein is supplied on line 136 with the signal EA on one input terminal thereof and the data output signal from the terminal DO of the expansion storage element 114 on the second input terminal thereof. The output terminal of the AND gate 178 is coupled to the enable (E) terminal of the demultiplexer 160. When $\overline{EA}$ is true and if the terminal DO of the expansion storage element 114 is also true at the same time, the demultiplexer 160 is enabled and one only of the output terminals thereof, Y0, Y1, Y2 or Y3 will be at the true voltage level. The particular one of these terminals thereby set true is a function of the state of the row address signal, comprising the signals RA1 and RA2 supplied to the address input terminals A1 and A2, respectively, of the demultiplexer 160. Each one of the separate output terminals of the demultiplexer 160 is coupled, via the cable 180, to the second input terminal of one of the OR gates 170, 172, 174 and 176 in the data output mixer portion 144B (FIG. 11C). For example, the output terminal Y1 of the demultiplexer 160 is coupled to a line carrying a signal designated DOES2 which is, in turn, coupled to the second input terminal of OR gate 172. OR gate 172 is associated with base storage element 112B. DOES2 can only be set true when RA1 is false and RA2 is true (RA = 01). This is the same state of the row address signal which causes the Y1 output terminal of the decoder 158 in the element selector 130 (FIG. 11B) to be set true and, correspondingly, CD2 to be set false thereby disabling storage element 112B. As described here, the result of the operation of the AND gate 178 and the demultiplexer 160 is to supply a word segment from the expansion storage element 114 to a selected line on the data output cable 150 when that line is otherwise prevented from receiving data from its associated base storage element.

Input data word segments are supplied to the odd-sized memory section of FIGS. 11A, 11B and 11C on the cable 154. In FIG. 11C, each of the several conductors, here four, of cable 154 are connected to a different one of the base storage elements 112A, 112B, 112C and 112D. For example, the signal for the word segment, here one bit in length, designated DINS1 is supplied to the DI terminal of base storage element 112A. Since one of the four base storage elements 112A, 112B, 112C or 112D in a full Class 2 odd-sized memory section will always be disabled when $\overline{EA}$ is true, one of the four word segments DINS1, DINS2, DINS3 or DINS4 on the input data cable must be steered to the expansion storage element 114 (FIG. 11B) when EA is true. This steering is accomplished in the input data selector 156 (FIG. 11B) which has four two-input AND gates 182 and one four-input OR gate 184. The output of the OR gate 184 is coupled to supply an input bit to the DI terminal of the expansion storage element 114 by line 158. The output of each of the AND gates 182 is supplied as an input to the OR gate 184. Each of the AND gates 182 is supplied with a different one of the input data bits at one of its input terminals via the cable 154. The second input terminal of each of the AND gates 182 is connected to a different one of the signals output by the decoder 158, at its terminals Y0, Y1, Y2 and Y3, in the element selector 130. The state of the row address signal (RA1 and RA2) supplied to the decoder 158 determines which one of the four AND gates 182 will be enabled to transmit an input data bit through the OR gate 184 to the expansion storage element 114. The same state of the row address signal which selects a particular word segment for transmission to the expansion storage element 114 disables the particular base storage element 112A, 112B, 112C or 112D which is also coupled to receive that word segment, both effects being a result of the operation of and intercoupling of the decoder 158 in the element selector 130.

In a read-only memory, the input data selector 156 is deleted along with its connections to elements selector 130 and the expansion storage element 114.

To build a partial odd-sized memory section, one or more of the base storage elements are deleted along with all of the components and connections supplying signals to and from the deleted storage elements only. However, no one of the major functions of the memory, as shown in FIG. 10, is eliminated for a partial section.

To build an odd-sized memory having two or more oddsized memory sections combined, one additional expansion storage element and at least one additional base storage element is added for each additional section. The output data mixer 144 requires an additional AND gate 178 and an additional demultiplexer 160 for each additional expansion storage element along with an additional OR gate to be associated with the output of each of the additional base storage elements. Although additional connections must be made to the outputs of the row address synthesizer 126 and to the outputs of the element selector 130, these functional entities do not require additional components when memory sections are combined. However, the input data selector 156 must be augmented to provide at least one AND gate 182 for each word segment on the data input cable 154 and at least one OR gate 184 to supply data to each expansion storage element.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. A memory for storing a plurality of individually addressable words, each word having at least one word segment, wherein each word segment of each of the words is stored in a different one of a plurality of distinct storage elements, the elements being separated into a first group of storage elements and a second group of storage elements, and wherein each of the storage locations for a word is identified for access by a memory address signal having at least as many possible states as the number of words to be accessed, the memory address signal having an expansion address signal component thereof having a first state and a second state; which memory comprises:

a. means for accessing the first group of storage elements when the expansion address signal is in its first state only; and b. means for accessing less than all of the storage locations in the second group of storage elements when the expansion adress signal is in its first state.

2. A memory as recited in claim 1 which comprises means for accessing only the second group of storage elements when the expansion address signal is in its second state.

3. An odd-sized memory for storing at least W individually addressable words, each word comprising a plurality of word segments, where W is an integer greater than $2^M$ but less than $2^{M+1}$ and where M is an integer greater than zero, which comprises:

a. means for generating an expansion address signal having a first state and a second state;

b. means for generating a row address signal having at least $2^N$ possible states, N being an integer greater than zero but no greater than M;

c. at least two storage elements each having a plurality of individually addressable storage locations for word segments, each of said storage elements having addressing means operatively associated therewith for responding to an element address signal supplied thereto to identify a storage location therein for access, each of said storage elements further having enabling means operatively associated therewith for enabling access to an identified storage location in response to an enabling signal supplied thereto;

d. means for supplying an element address signal having $2^M$ possible states to said storage elements when the expansion address signal is in its first state;

e. first means for supplying an enabling signal to a first one of said storage elements when the expansion address signal is in its first state; and f. second means for supplying an enabling signal to a second one of said storage elements when the expansion address signal is in its first state and when the row address signal is in certain selected states, fewer than $2^N$ in number, whereby some, but not all, of the storage locations in said second storage element are selected to be unavailable for access when the expansion address signal is in its first state.

4. An odd-sized memory as recited in claim 3, the memory having a memory address signal supplied thereto to identify a particular word for access, wherein said means for generating an expansion address signal is responsive to the memory address signal.

5. An odd-sized memory as recited in claim 3, the memory having a memory address signal supplied thereto to identify a particular word for access, wherein said means for generating a row address signal is responsive to the memory address signal.

6. An odd-sized memory as recited in claim 3, the memory having a memory address signal supplied thereto to identify a particular word for access, wherein said means for generating an element address signal is responsive to the memory address signal.

7. An odd-sized memory as recited in claim 3, wherein said first means for supplying an enabling signal is responsive to the expansion address signal.

8. An odd-sized memory as recited in claim 3, wherein said second means for supplying an enabling signal is responsive jointly to the expansion address signal and the row address signal.

9. An odd-sized memory as recited in claim 3, which comprises means for supplying a synthesized element address signal to said second storage element when the expansion address signal is in its second state, the synthesized element address signal being effective to identify for access only those storage locations selected to be unavailable when the expansion address signal is in its first state.

10. An odd-sized memory as recited in claim 9 wherein said means for supplying a synthesized element address signal to said second storage element is responsive jointly to the expansion address signal and the row address signal.

11. An odd-sized memory as recited in claim 3 which comprises means for supplying a synthesized element address signal to said second storage element when the expansion address signal is in its second state, the synthesized element address signal having $2^M$ possible states but being restricted to assume only those states which are effective to identify for access those storage locations selected to be unavailable when the expansion address signal is in its first state.

12. An odd-sized memory as recited in claim 11 wherein said means for supplying a synthesized element address signal to said second storage element is responsive jointly to the expansion address signal and the row address signal.

13. An odd-sized memory as recited in claim 3 wherein said storage elements each have word segment signal output means operatively associated therewith for producing a word segment output signal from an identified storage location therein, the word segment output signal appearing at the signal output means of a particular storage element only when that storage element has its enabling signal supplied thereto, the odd-sized memory comprising gate means coupled to the signal output means of said first and second storage elements for transmitting either the word segment output signal of said first storage element or the word segment output signal of said second storage element to the memory output means of the complete odd-sized memory.

14. An odd-sized memory as recited in claim 13 wherein said gate means comprises OR gate means for transmitting the word segment output signal of said first storage element to the memory output means when said second storage element is not enabled for access and for transmitting the word segment output signal of said second storage element to the memory output means when said second storage element is enabled for access.

15. An odd-sized memory as recited in claim 14 wherein said gate means comprises a demultiplexer logic circuit, said demultiplexer having a plurality of output circuits for transmitting word segment output signals, said first one of the demultiplexer output circuits being coupled to said OR gate means, said demultiplexer also having the row address signal coupled to decoder circuits therein for selecting the first of the demultiplexer output circuits to be activated for the transmission of a word segment output signal when said second storage element is not enabled for access, said demultiplexer further having the word segment output signal of said first storage element coupled to signal input circuits thereof for transmission to the selected demultiplexer output circuits when the expansion address signal is in its first state.

16. An improved memory for storing at least W individually addressable words, where W is an integer greater than $2^M$ but less than $2^{M+1}$ and where M is an integer greater than zero, the memory having a memory address signal supplied thereto to identify a particular word for access, the memory address signal having at least $2^{M+1}$ possible states, the memory being of the type wherein a plurality of physically distinct storage elements are operatively interconnected, each storage element having a plurality of individually addressable storage locations for segments of words, each storage element also having element addressing means associated therewith for identifying a particular storage location for access in response to an element address signal supplied thereto and each storage element further having enabling means associated therewith for enabling access to an identified storage location in response to an enabling signal supplied thereto, wherein the improvement comprises:

a. means responsive to the memory address signal for generating an expansion address signal having a first possible state and a second possible state;
b. means responsive to the memory address signal for generating a row address signal having at least $2^N$ possible states, N being an integer greater than zero but no greater than M;
c. means responsive to the memory address signal for supplying an element address signal having $2^M$ possible states to a first storage element and to a second storage element when the expansion address signal is in its first state;
d. means responsive to the expansion address signal for supplying an enabling signal to the first storage element when the expansion address signal is in its first state; and
e. means responsive jointly to the expansion address signal and the row address signal for supplying an enabling signal to the second storage element when the expansion address signal is in its first state and when the row address signal is in certain selected states, fewer than $2^N$ in number, whereby some, but not all, of the storage locations in the second storage element are selected to be unavailable for access when the expansion address signal is in its first state.

17. An improved memory as recited in claim 16 wherein the improvement comprises means responsive jointly to the expansion address signal and the row address signal for supplying a synthesized element address signal to the second storage element when the expansion address signal is in its second state, the synthesized element address signal being effective to identify for access only those storage locations selected to be unavailable when the expansion address signal is in its first state.

18. An improved memory as recited in claim 16 wherein the improvement comprises means responsive jointly to the expansion address signal and the row address signal for supplying a synthesized element address signal to the second storage element when the expansion address signal is in its second state, the synthesized element address signal having $2^M$ possible state but being restricted to assume only those states which are effective to identify for access those storage locations selected to be unavailable when said expansion address signal is in its first state.

19. An improved memory as recited in claim 16 wherein the first and second storage elements each have word segment signal output means operatively associated therewith for producing a word segment output signal from an identified storage location therein, the word segment output signal appearing at the signal output means of a particular storage element only when that storage element has its enabling signal supplied thereto, the improvement comprising gate means coupled to the signal output means of the first and second storage elements for transmitting either the word segment output signal of the first storage element or the word segment output signal of the second storage element to the memory output means of the complete odd-sized memory.

20. An improved memory as recited in claim 19 wherein said gate means comprises OR gate means for transmitting the word segment output signal of the first storage element to the memory output means when the second storage element is not enabled for access and for transmitting the word segment output signal of the second storage element to the memory output means when the second storage element is enabled for access.

21. An odd-sized memory as recited in claim 20 wherein said gate means comprises a demultiplexer logic circuit, said demultiplexer having a plurality of output circuits for transmitting word segment output signals, a first one of the demultiplexer output circuits being coupled to said OR gate means, said demultiplexer also having the row address signal coupled to decoder circuits therein for selecting the first of the demultiplexer output circuits to be activated for the transmission of a word segment output signal when the second storage element is not enabled for access, said demultiplexer further having the word segment output signal of the first storage element coupled to signal input circuits thereof for transmission to the selected demultiplexer output circuits when the expansion address signal is in its first state.

22. An odd-sized memory for storing at least W individually addressable words, where W is an integer greater than $2^M$ but less than $2^{M+1}$ and M is an integer greater than zero, the memory comprising word segment storage locations mapped onto a graphic array of rows and columns, the array having at least $2^N$ rows in a base array portion thereof, N being an integer greater than zero but no greater than M, the array also having at least one row in an expansion array portion thereof, the odd-sized memory comprising, in combination:

a. means for generating a memory address signal having at least $2^{M+1}$ possible states, the memory address signal comprising an expansion address signal having a first state associated with mapping selected storage locations onto the base array portion and a second state associated with mapping other selected storage locations onto the expansion array portion, the memory address signal also comprising a row address signal having at least $2^N$ possible states each distinct one of which is associated with mapping selected groups of storage locations onto corresponding distinct rows of the base array portion;
b. at least K+1 storage elements each having a plurality of individually addressable storage locations therein for word segments, K being equal to the number of word segments comprising a word, each of said storage elements having addressing means operatively associated therewith for responding to an element address signal supplied thereto for identifying a particular one of the storage locations therein for access, each of said storage elements also having enabling means operatively associated therewith for responding to an enabling signal supplied thereto for allowing access to the identified storage location, said storage elements being divided into a first group of at least K base storage elements and a second group of at least one expansion storage element;
c. means for supplying the same base array element address signal to all of said storage elements when the expansion address signal is in its first state, the base array element address signal having the row address signal as a component thereof whereby the storage locations of each of said storage elements are, in effect, divided by the row address signal into at least $2^N$ groups, one distinct group for each of the possible states of the row address signal;

d. means responsive to the row address signal, when the expansion address is in its first state, for selectively applying an enabling signal to said base storage elements for at least one but less than all of the possible states of the row address signal whereby at least one group of storage locations in each of said base storage elements is reserved for mapping onto the expansion array portion; and e. means responsive to the expansion address signal for supplying an enabling signal to each expansion storage element whenever the expansion address signal is in its first state only whereby the storage locations in expansion storage elements are reserved for mapping onto the base array portion.

23. An odd-sized memory as recited in claim 22 which comprises means responsive to the row address signal and the expansion address signal jointly, when the expansion address is in its second state, for supplying both an enabling signal and an expansion array element address signal to each base storage element, each of the expansion array element address signals having a synthesized row address portion adapted to cause the reserved group of storage locations in each of said base storage elements to be mapped onto the expansion array portion.

24. An odd-sized memory as recited in claim 22 wherein the means for reading a word out of the memory comprises gate means responsive jointly to the expansion address signal and the row address signal for reading out at least one word segment of the word from an expansion storage element when the expansion address signal is in its first state and reading out all word segments of the word from base storage elements when the expansion address signal is in its second state.

25. A Class N odd-sized memory section for storing segments of at least W individually addressable words, W being an integer greater than $2^M$ but less than $2^{M+1}$, M being an integer greater than zero, and N being an integer greater than zero but no greater than M; wherein the memory section is organized for addressing into an array of R rows and C columns, R being equal to $2^N+1$ and C being an integer greater than zero but no greater than $2^N$, each column having a word segment in each individually addressable location thereof and each row having $2^{M-N}$ individually addressable locations of length C word segments each; and wherein the array is partitioned into a base array portion comprising $2^N$ of the rows and an expansion array portion comprising the remaining row not included in the base array portion; the memory section comprising, in combination:

a. means for generating a memory address signal for the memory section wherein the memory address signal has a length of M+1 bits partitioned into a common address signal comprising the M—N least significant bits thereof, an expansion address signal comprising the most significant bit thereof, and a row address signal comprising the N bits thereof intermediate the most significant bit and the M—N least significant bits, wherein the expansion address signal has a first state effective for selecting the addressable locations of the base array portion for access and a second state effective for selecting the addressable locations of the expansion array portion for access, and wherein the row address signal has $2^N$ possible states, each one of which is effective for selecting a different one of the rows of the base array portion for access;

b. C+1 storage elements each having $2^M$ individually addressable storage locations for word segments therein, each storage element also having addressing means operatively associated therewith for responding to an M—bit element address signal supplied thereto to identify a storage location for access, and each storage element further having enabling means operatively associated therewith for responding to an enabling signal applied thereto to enable access to an identified storage location, said storage elements being grouped into a first set comprising C base storage elements, each one of which is reserved for storing word segments associated with a different specific column of the array, and a second set comprising one expansion storage element;

c. means responsive to the expansion address signal for supplying an enabling signal to said expansion storage element only when the expansion address signal is in its first state whereby said expansion storage element is reserved for storing word segments situated in the base array portion;

d. means responsive jointly to the expansion address signal and the row address signal for supplying an enabling signal to each one of said base storage elements when the expansion address signal is in its first state for all but one selected one of the $2^N$ possible states of the row address signal, a different state of the row address signal being selected to be effective for the absence of the enabling signal for each different one of said base storage elements whereby each base storage element has $2^{M-N}$ storage locations therein selected to be unavailable for access when the expansion address signal is in its first state; and e. means for supplying an M-bit element address signal to said storage elements wherein the element address signal comprises the common address signal for the M—N least significant bits thereof and the row address signal for the N most significant bits thereof when the expansion address signal is in its first state.

26. A class N odd-sized memory section as recited in claim 25 which comprises means for supplying a different M-bit element address signal to each distinct one of said base storage elements when the expansion address signal is in its second state wherein each of the different element address signals comprises the common address signal for the M—N least significant bits thereof and, for the N most significant bits thereof, a signal having that selected row address signal state for each of said base storage elements for which no enabling signal is supplied when the expansion address is in its first state.

27. A class N odd-sized memory section as recited in claim 25 wherein the means for reading a word out of the memory comprises gate means responsive jointly to the expansion address signal and the row address signal for reading out at least one word segment of the word from an expansion storage element when the expansion address signal is in its first state and reading out all word segments of the word from base storage elements when the expansion address signal is in its second state.

28. A method of accessing a memory capable of storing a plurality of individually addressable words, each word having at least one word segment, wherein each word segment of each of the words is stored in a different one of a plurality of distinct storage elements, the elements being separated into a first group of storage elements and a second group of storage elements, and wherein each storage location for a word is identified for access by a memory address signal having at least as many possible states as the number of words to be accessed, the memory address signal having an expansion address signal component thereof having a first state and a second state, which method comprises:

a. accessing the first group of storge elements when the expansion address signal is in its first state only; and b. accessing less than all of the storage locations in the second group of storage elements when the expansion address signal is in its first state.

29. A method of accessing a memory as recited in claim 28 which comprises accessing only the second group of storage elements when the expansion address signal is in its second state.

30. A method of addressing a memory for storing at least W individually addressable words, where W is an integer greater than $2^M$ but less than $2^{M+1}$ and where M is an integer greater than zero, the memory including a base storage element and an expansion storage element, the base and expansion storage elements each having a plurality of individually addressable storage locations for segments of words, the storage elements also having addressing means operatively associated therewith for responding to an element address signal supplied thereto to identify an individual storage location therein for access, and the storage elements further having enabling means operatively associated therewith for responding to an enabling signal supplied thereto to enable access to an identified storage location, which method comprises:

a. generating a memory address signal having at least $2^{M+1}$ possible states wherein the memory address signal comprises an expansion address signal having a first state and a second state, a row address signal having at least $2^N$ states, N being an integer greater than zero but no greater than M, and a common address signal having at least $2^{M-N}$ states;

b. supplying an element address signal comprising the common address signal and the row address signal to the base and expansion storage elements when the expansion address signal is in its first state;

c. supplying an enabling signal to the expansion storate element when the expansion address signal is in its first state;

d. selecting at least one state of the row address signal to identify at least $2^{M-N}$ storage locations in the base storage element for access only when the expansion address signal is in its second state; and e. supplying an enabling signal to the base storage element for all states of the row address signal, other than the selected row address signal states, when the expansion address signal is in its first state.

31. A method of addressing a memory as recited in claim 30 which comprises:

a. generating a synthesized row address signal having at least $2^N$ possible states but restricted to having only the selected row address signal states;

b. supplying an element address signal comprising the common address signal and the synthesized row address signal to the base storage element when the expansion address signal is in its second state; and c. supplying an enabling signal to the base storage element when the expansion address signal is in its second state.

* * * * *

UNITED STATES PATENT AND TRADEMARK OFFICE

CERTIFICATE OF CORRECTION

PATENT NO. : 3,906,458

DATED : September 16, 1975

INVENTOR(S) : Randall G. Ehlers

It is certified that error appears in the above-identified patent and that said Letters Patent are hereby corrected as shown below:

Col. 2, line 6, change "244" to --224--.
Col. 3, line 12, change "priorart" to --prior-art--.
Col. 5, line 34, between "elements" and "at", insert --,--.
line 52, change "an" to --is--.
line 53, change "comumn" to --column--.
Col. 6, line 7, change "is", first occurrence, to --it--.
line 41, change "or" to --of--.
Col. 9, line 9, change "have" to --here--.
Col. 10, line 47, change "designators" to --designations--.
line 47, change "stop" to --step--.
line 67, change "W" to --w--.
Col. 11, line 8, rewrite Step 21 as follows:
--(92): $(2^5+1)(2^{8-5}) = 33 \times 8 = 264 = w$--.
line 22, align the "1" of Step 1 with the other step numbers.
Col. 15, line 17, change "able" to --cable--.
line 58, change "tow" to --two--.
Col. 16, line 60, change "EA" to --$\underline{EA}$--.
Col. 17, line 41, change "EA" to --$\overline{EA}$--.
Col. 18, line 55, change "adress" to --address--.
Col. 20, line 40, change "said" to --a--.
Col. 21, line 46, change "state" to --states--.
Col. 25, line 14, change "storge" to --storage--.
Col. 26, line 15, change "ate" to --age--.

Signed and Sealed this

*second* Day of *December 1975*

[SEAL]

*Attest:*

RUTH C. MASON
*Attesting Officer*

C. MARSHALL DANN
*Commissioner of Patents and Trademarks*